(12) United States Patent
Erickson

(10) Patent No.: US 10,137,556 B2
(45) Date of Patent: Nov. 27, 2018

(54) SHAPED ABRASIVE PARTICLES WITH LOW ROUNDNESS FACTOR

(75) Inventor: Dwight D. Erickson, Oakdale, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 295 days.

(21) Appl. No.: 12/570,067

(22) Filed: Sep. 30, 2009

(65) Prior Publication Data

US 2010/0319269 A1 Dec. 23, 2010

Related U.S. Application Data

(60) Provisional application No. 61/219,161, filed on Jun. 22, 2009.

(51) Int. Cl.
| | |
|---|---|
| *B24B 1/00* | (2006.01) |
| *B24D 11/00* | (2006.01) |
| *C09K 3/14* | (2006.01) |
| *C01F 7/02* | (2006.01) |
| *C04B 35/111* | (2006.01) |
| *C04B 35/628* | (2006.01) |

(52) U.S. Cl.
CPC ............... *B24D 11/00* (2013.01); *C01F 7/02* (2013.01); *C04B 35/1115* (2013.01); *C04B 35/62815* (2013.01); *C09K 3/1409* (2013.01); *C01P 2004/02* (2013.01); *C01P 2004/20* (2013.01); *C01P 2004/22* (2013.01); *C04B 2235/3217* (2013.01); *C04B 2235/5296* (2013.01); *Y10T 428/2982* (2013.01)

(58) Field of Classification Search
USPC ............................................. 51/295; 428/402
See application file for complete search history.

(56) References Cited

U.S. PATENT DOCUMENTS

| | | | |
|---|---|---|---|
| 1,910,444 A | 5/1933 | Nicholson | |
| 3,041,156 A | 6/1962 | Rowe et al. | |
| 3,079,243 A | 2/1963 | Ueltz | |
| 3,387,957 A | 6/1968 | Howard | |
| 3,481,723 A * | 12/1969 | Rue et al. ....................... 51/298 |
| 3,536,005 A | 10/1970 | Derrickson | |
| 3,874,856 A | 4/1975 | Leeds | |
| 3,909,991 A | 10/1975 | Coes, Jr. | |

(Continued)

FOREIGN PATENT DOCUMENTS

| | | |
|---|---|---|
| CA | 743 715 | 10/1966 |
| EP | 0 293 163 | 11/1988 |

(Continued)

OTHER PUBLICATIONS

U.S. Appl. No. 61/016,965 entitled "Shaped, Fractured Abrasive Particle, Abrasive Article Using Same and Method of Making", filed Dec. 27, 2007.

(Continued)

*Primary Examiner* — Colleen P Dunn
*Assistant Examiner* — Ross J Christie

(57) ABSTRACT

Shaped abrasive particles comprising alpha alumina and having a cross-sectional shape along a longitudinal axis of the shaped abrasive particles, the cross-sectional shape comprising a non-circular cross-sectional plane, and the shaped abrasive particles comprise an Average Roundness Factor of between about 15% to 0%.

20 Claims, 3 Drawing Sheets

(56) References Cited

U.S. PATENT DOCUMENTS

| | | |
|---|---|---|
| 4,150,078 A | 4/1979 | Miller et al. |
| 4,314,827 A | 2/1982 | Leitheiser et al. |
| 4,341,663 A | 7/1982 | Derleth et al. |
| 4,393,021 A | 7/1983 | Eisenberg et al. |
| 4,548,617 A | 10/1985 | Miyatani et al. |
| 4,744,802 A | 5/1988 | Schwabel |
| 4,799,939 A | 1/1989 | Bloecher et al. |
| 4,848,041 A | 7/1989 | Kruschke |
| 4,954,462 A | 9/1990 | Wood |
| 4,963,012 A | 10/1990 | Tracy |
| 4,997,461 A | 3/1991 | Markhoff-Matheny et al. |
| 5,009,675 A | 4/1991 | Kunz et al. |
| 5,009,676 A | 4/1991 | Rue et al. |
| 5,011,508 A | 4/1991 | Wald et al. |
| 5,035,723 A | 7/1991 | Kalinowski |
| 5,042,991 A | 8/1991 | Kunz et al. |
| 5,049,166 A | 9/1991 | Kirkendall |
| 5,049,645 A | 9/1991 | Nagaoka et al. |
| 5,078,753 A | 1/1992 | Broberg et al. |
| 5,085,671 A | 2/1992 | Martin et al. |
| 5,090,968 A | 2/1992 | Pellow |
| 5,120,327 A | 6/1992 | Dennis |
| 5,152,917 A | 10/1992 | Pieper et al. |
| 5,185,299 A | 2/1993 | Wood et al. |
| 5,201,916 A | 4/1993 | Berg et al. |
| 5,213,591 A | 5/1993 | Celikkaya et al. |
| 5,282,875 A | 2/1994 | Wood |
| 5,286,687 A | 2/1994 | Murase |
| 5,304,331 A | 4/1994 | Leonard et al. |
| 5,312,789 A | 5/1994 | Wood |
| 5,312,791 A | 5/1994 | Coblenz et al. |
| 5,366,523 A | 11/1994 | Rowenhorst et al. |
| 5,409,645 A | 4/1995 | Torre, Jr. et al. |
| 5,431,967 A | 7/1995 | Manthiram |
| 5,435,816 A | 7/1995 | Spurgeon et al. |
| 5,441,549 A | 8/1995 | Helmin |
| 5,443,603 A | 8/1995 | Kirkendall |
| 5,454,844 A | 10/1995 | Hibbard et al. |
| 5,496,386 A | 3/1996 | Broberg et al. |
| 5,516,348 A | 5/1996 | Conwell et al. |
| 5,551,963 A | 9/1996 | Larmie |
| 5,576,409 A | 11/1996 | Mackey |
| 5,584,896 A * | 12/1996 | Broberg et al. ............... 51/295 |
| RE35,570 E | 7/1997 | Rowenhorst et al. |
| 5,645,619 A | 7/1997 | Erickson et al. |
| 5,667,542 A | 9/1997 | Law et al. |
| 5,672,097 A | 9/1997 | Hoopman |
| 5,725,162 A | 3/1998 | Garg |
| 5,759,213 A | 6/1998 | Adair |
| 5,776,214 A | 7/1998 | Wood |
| 5,779,743 A | 7/1998 | Wood |
| 5,893,935 A | 4/1999 | Wood |
| 5,902,647 A | 5/1999 | Venkataramani |
| 5,908,477 A | 6/1999 | Harmer et al. |
| 5,908,478 A | 6/1999 | Wood |
| 5,946,991 A | 9/1999 | Hoopman |
| 5,975,987 A | 11/1999 | Hoopman et al. |
| 5,984,988 A | 11/1999 | Berg et al. |
| 6,019,805 A | 2/2000 | Herron |
| 6,053,956 A | 4/2000 | Wood |
| 6,054,093 A | 4/2000 | Torre, Jr. et al. |
| 6,070,815 A * | 6/2000 | Miyatake ............... 241/47 |
| 6,080,215 A | 6/2000 | Stubbs |
| 6,080,216 A | 6/2000 | Erickson |
| 6,129,540 A | 10/2000 | Hoopman et al. |
| 6,165,437 A | 12/2000 | Mohri |
| 6,206,942 B1 | 3/2001 | Wood |
| 6,228,134 B1 | 5/2001 | Erickson |
| 6,261,682 B1 | 7/2001 | Law |
| 6,264,710 B1 | 7/2001 | Erickson |
| 6,277,160 B1 | 8/2001 | Stubbs |
| 6,277,161 B1 | 8/2001 | Castro et al. |
| 6,287,353 B1 | 9/2001 | Celikkaya |
| 6,312,324 B1 | 11/2001 | Mitsui et al. |
| 6,319,108 B1 | 11/2001 | Adefris |
| 6,475,253 B2 | 11/2002 | Culler et al. |
| 6,524,681 B1 | 2/2003 | Seitz et al. |
| 6,696,258 B1 | 2/2004 | Wei |
| 6,843,815 B1 | 1/2005 | Thurber et al. |
| 6,881,483 B2 | 4/2005 | McArdle |
| 6,974,930 B2 | 12/2005 | Jense |
| 7,297,402 B2 | 11/2007 | Evans |
| 7,373,887 B2 | 5/2008 | Jackson |
| 2001/0027623 A1 | 10/2001 | Rosenflanz |
| 2002/0026752 A1 | 3/2002 | Culler et al. |
| 2002/0151265 A1 | 10/2002 | Adefris |
| 2003/0085204 A1 | 5/2003 | Lagos |
| 2003/0110707 A1 | 6/2003 | Rosenflanz et al. |
| 2003/0126800 A1 | 7/2003 | Seth et al. |
| 2004/0003895 A1 | 1/2004 | Amano et al. |
| 2004/0148967 A1 | 8/2004 | Celikkaya et al. |
| 2004/0235406 A1 | 11/2004 | Duescher |
| 2004/0244675 A1 | 12/2004 | Kishimoto |
| 2005/0020190 A1 | 1/2005 | Schutz et al. |
| 2005/0060941 A1 | 3/2005 | Provow |
| 2005/0060947 A1 | 3/2005 | McArdle |
| 2005/0064805 A1 | 3/2005 | Culler et al. |
| 2005/0118939 A1 * | 6/2005 | Duescher ............... 451/527 |
| 2005/0132655 A1 | 6/2005 | Anderson et al. |
| 2005/0232853 A1 | 10/2005 | Evans |
| 2005/0284029 A1 | 12/2005 | Bourlier |
| 2006/0185256 A1 | 8/2006 | Nevor et al. |
| 2007/0020457 A1 | 1/2007 | Adefris |
| 2007/0072527 A1 * | 3/2007 | Palmgren ............... 51/295 |
| 2007/0287366 A1 * | 12/2007 | Sanders et al. ............... 451/526 |
| 2008/0172951 A1 | 7/2008 | Starling |
| 2009/0016916 A1 | 1/2009 | Rosenzweig et al. |
| 2010/0003904 A1 | 1/2010 | Duescher |

FOREIGN PATENT DOCUMENTS

| | | |
|---|---|---|
| EP | 0 662 110 | 7/1995 |
| EP | 1 148 028 | 10/2001 |
| GB | 986 847 | 3/1965 |
| JP | 60-006356 | 1/1985 |
| JP | 2002-038131 | 2/2002 |
| JP | 2003-049158 | 2/2003 |
| JP | 2004-510873 | 4/2004 |
| JP | 2006-192540 | 7/2006 |
| RU | 1787753 | 1/1993 |
| WO | WO95/18192 | 7/1995 |
| WO | WO99/38817 | 8/1999 |
| WO | WO01/14494 | 3/2001 |
| WO | WO 2006/101306 | 9/2006 |

OTHER PUBLICATIONS

U.S. Appl. No. 12/337,001 entitled "Method of Making Abrasive Shards, Shaped Abrasive Particles With an Opening, or Dish-Shaped Abrasive Particles", filed Dec. 17, 2008.

U.S. Appl. No. 12/336,961 entitled "Dish-Shaped Abrasive Particles With a Recessed Surface", filed Dec. 17, 2008.

U.S. Appl. No. 12/337,112 entitled "Shaped Abrasive Particles With an Opening", filed Dec. 17, 2008.

U.S. Appl. No. 61/138,268 entitled "Shaped Abrasive Particles With Grooves", filed Dec. 17, 2008.

U.S. Appl. No. 12/337,075 entitled "Shaped Abrasive Particles With a Sloping Sidewall", filed Dec. 17, 2008.

U.S. Appl. No. 12/827,274 entitled "Transfer Assisted Screen Printing Method of Making Shaped Abrasive Particles and the Resulting Shaped Abrasive Particles", filed Jun. 30, 2010.

EP Search Report for 10797517.9, dated Sep. 2, 2015, 6 page.

* cited by examiner

SHAPED ABRASIVE PARTICLES WITH LOW ROUNDNESS FACTOR

This patent application claims the benefit of U.S. provisional application Ser. No. 61/219,161 filed on Jun. 22, 2009 and entitled "Shaped Abrasive Particles With Low Roundness Factor", which is hereby incorporated by reference in its entirety.

BACKGROUND

Abrasive particles and abrasive articles made from the abrasive particles are useful for abrading, finishing, or grinding a wide variety of materials and surfaces in the manufacturing of goods. As such, there continues to be a need for improving the cost, performance, or life of the abrasive particle and/or the abrasive article.

Triangular shaped abrasive particles and abrasive articles using the triangular shaped abrasive particles are disclosed in U.S. Pat. No. 5,201,916 to Berg; U.S. Pat. No. 5,366,523 to Rowenhorst (U.S. Pat. No. Re 35,570); and U.S. Pat. No. 5,984,988 to Berg. In one embodiment, the abrasive particles' shape comprised an equilateral triangle. Triangular shaped abrasive particles are useful in manufacturing abrasive articles having enhanced cut rates.

SUMMARY

Shaped abrasive particles, in general, can have superior performance over randomly crushed abrasive particles. By controlling the shape of the abrasive particle it is possible to control the resulting performance of the abrasive article. The inventors have discovered that by making the cross-sectional shape of the shaped abrasive particle with a low Roundness Factor improved grinding performance occurs.

When shaped abrasive particles are used to grind substrates, it is believed that the shaped abrasive particles tend to fracture during use by cleaving along fracture planes orientated transversely to the longitudinal axis of the shaped abrasive particle. These fracture planes are typically not orientated at an exact 90 degree angle to the longitudinal axis of the shaped abrasive particle that extends from the base of the shaped abrasive particle to its grinding apex. As such, the fracture planes tend to be sloped relative to the longitudinal axis and the base of the shaped abrasive particle. The sloped fracture plane tends to concentrate grinding forces along the edge of the highest portion of the fracture plane. Often this edge is where two faces of the shaped abrasive particle meet such as at a corner of the cross sectional fracture plane of the shaped abrasive particle. Since the highest corner of the fracture plane of the shaped abrasive particle now forms the grinding face, it is important that the highest corner be as sharp as possible. Alternatively, if a portion of an edge forms the grinding face, it is important that the edge be as flat and smooth as possible so as to behave similarly to a precisely sharpened chisel blade.

It is believed that corner and edge sharpness can be improved by processing conditions that provide improved filling and reduced shrinkage of the shaped abrasive particles while residing in the mold cavities used to form the shaped abrasive particles. In particular, it has been determined that as the drying rate is increased, the acid level of the sol gel that is used to fill the mold cavities to make the shaped abrasive particles should also be increased to create sharper corners and edges of the fracture plane. It was unexpected that the acid level of the sol gel would have a significant effect on the grinding performance and the resulting sharpness of the shaped abrasive particles, since after firing the shaped abrasive particles in a kiln, the shaped abrasive particles made with different acid levels had essentially the same hardness. Further improvements in corner sharpness can occur by minimizing damage to the precursor shaped abrasive particles during transport and handling. The precursor shaped abrasive particles being removed from the mold can have the edges rounded while being conveyed and transported into the kiln where the shaped abrasive particles are fired into the final hardened state.

The grinding performance of shaped abrasive particles has been correlated to an Average Roundness Factor with shaped abrasive particles having a lower Average Roundness Factor having improved grinding performance. Hence, in one embodiment, the invention resides in shaped abrasive particles comprising alpha alumina and having a cross-sectional shape along a longitudinal axis of the shaped abrasive particles, the cross-sectional shape comprising a non-circular cross-sectional plane, and the shaped abrasive particles comprise an Average Roundness Factor of between about 15% to 0%.

BRIEF DESCRIPTION OF THE DRAWINGS

It is to be understood by one of ordinary skill in the art that the present discussion is a description of exemplary embodiments only, and is not intended as limiting the broader aspects of the present disclosure, which broader aspects are embodied in the exemplary construction.

Figure 1:
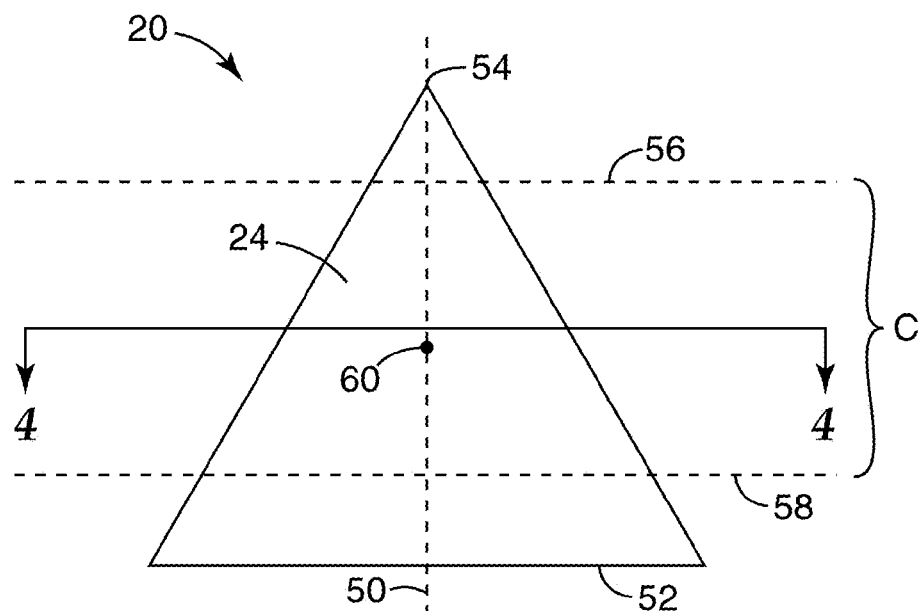
FIG. 1 illustrates a top view of a shaped abrasive particle having a triangular shape.

Repeated use of reference characters in the specification and drawings is intended to represent the same or analogous features or elements of the disclosure.

DEFINITIONS

As used herein, forms of the words "comprise", "have", and "include" are legally equivalent and open-ended. Therefore, additional non-recited elements, functions, steps or limitations may be present in addition to the recited elements, functions, steps, or limitations.

As used herein, the term "abrasive dispersion" means an alpha alumina precursor that can be converted into alpha alumina that is introduced into a mold cavity. The composition is referred to as an abrasive dispersion until sufficient volatile components are removed to bring solidification of the abrasive dispersion.

As used herein, the term "precursor shaped abrasive particle" means the unsintered particle produced by removing a sufficient amount of the volatile component from the abrasive dispersion, when it is in the mold cavity, to form a solidified body that can be removed from the mold cavity and substantially retain its molded shape in subsequent processing operations.

As used herein, the term "shaped abrasive particle", means a ceramic abrasive particle with at least a portion of the abrasive particle having a predetermined shape that is replicated from a mold cavity used to form the precursor shaped abrasive particle. Except in the case of abrasive shards (e.g. as described in U.S. provisional application 61/016,965), the shaped abrasive particle will generally have a predetermined geometric shape that substantially replicates the mold cavity that was used to form the shaped abrasive particle. Shaped abrasive particle as used herein excludes abrasive particles obtained by a mechanical crushing operation.

DETAILED DESCRIPTION

Shaped Abrasive Particle with a Low Roundness Factor

Figure 2:
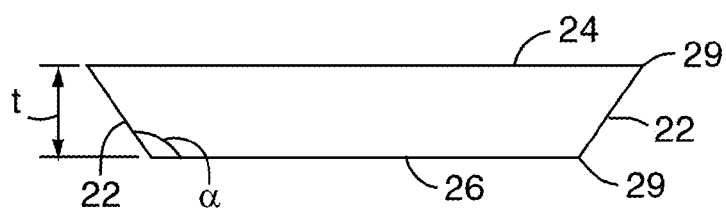
FIG. 2 illustrates a side view of the shaped abrasive particle of FIG. 1.

Referring to FIGS. 1 and 2, an exemplary shaped abrasive particle 20 is illustrated. In some embodiments, the shaped abrasive particle comprises a sidewall 22 having a draft angle α other than 90 degrees and referred to hereafter as a sloping sidewall. The material from which the shaped abrasive particle 20 is made comprises alpha alumina. Alpha alumina particles can be made from a dispersion of aluminum oxide monohydrate that is gelled, molded to shape, dried to retain the shape, calcined, and then sintered as discussed herein later. The shaped abrasive particle's shape is retained without the need for a binder to form an agglomerate comprising abrasive particles in a binder that are then formed into a shaped structure.

In general, the shaped abrasive particles 20 comprise thin bodies having a first face 24, and a second face 26 and having a thickness t. In some embodiments, the thickness t ranges between about 25 micrometers to about 500 micrometers. The first face 24 and the second face 26 are connected to each other by at least one sidewall 22, which may be a sloping sidewall. In some embodiments, more than one sloping sidewall 22 can be present and the slope or angle for each sloping sidewall 22 may be the same or different as more fully described in pending U.S. patent application Ser. No. 12/337,075 filed on Dec. 17, 2008 entitled "Shaped Abrasive Particles With A Sloping Sidewall."

In some embodiments, the first face 24 is substantially planar, the second face 26 is substantially planar, or both faces are substantially planar. Alternatively, the faces could be concave or convex as discussed in more detail in copending U.S. patent application Ser. No. 12/336,961 entitled "Dish-Shaped Abrasive Particles With A Recessed Surface", filed on Dec. 17, 2008. Additionally, an opening or aperture through the faces could be present as discussed in more detail in copending U.S. patent application Ser. No. 12/337,112 entitled "Shaped Abrasive Particles With An Opening", filed on Dec. 17, 2008.

In one embodiment, the first face 24 and the second face 26 are substantially parallel to each other. In other embodiments, the first face 24 and second face 26 can be nonparallel such that one face is sloped with respect to the other face and imaginary lines tangent to each face would intersect at a point. The sidewall 22 of the shaped abrasive particle 20 can vary and it generally forms the perimeter 29 of the first face 24 and the second face 26. In one embodiment, the perimeter 29 of the first face 24 and the second face 26 is selected to be a geometric shape, and the first face 24 and the second face 26 are selected to have the same geometric shape; although, they differ in size with one face being larger than the other face. In one embodiment, the perimeter 29 of first face 24 and the perimeter 29 of the second face 26 was a triangular shape that is illustrated.

Figure 6:
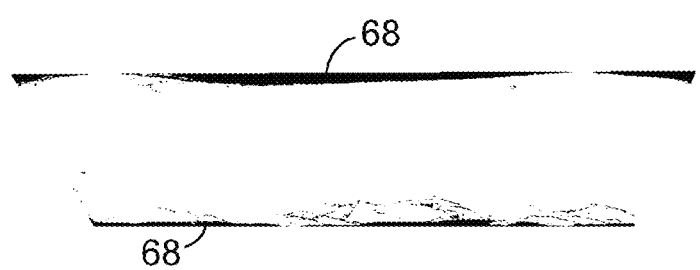
FIG. 6 illustrates the area present between the tangent lines of FIG. 5 and the faces of the shaped abrasive particle of FIG. 4.
Figure 7:
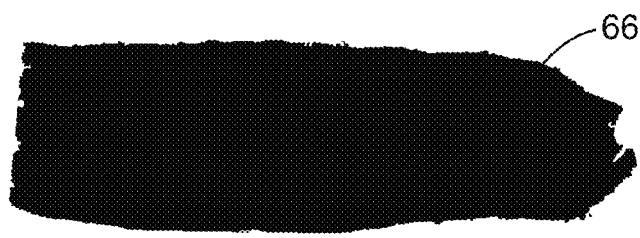
FIG. 7 illustrates the measured area of a prior art cross-sectional plane of a triangular shaped abrasive particle.

The draft angle α between the second face 26 and the sidewall 22 of the shaped abrasive particle 20 can be varied to change the relative sizes of each face. In various embodiments of the invention, the draft angle α can be between approximately 90 degrees to approximately 130 degrees, or between approximately 95 degrees to approximately 130 degrees, or between about 95 degrees to about 125 degrees, or between about 95 degrees to about 120 degrees, or between about 95 degrees to about 115 degrees, or between about 95 degrees to about 110 degrees, or between about 95 degrees to about 105 degrees, or between about 95 degrees to about 100 degrees. As discussed in U.S. patent application Ser. No. 12/337,075, specific ranges for the draft angle α have been found to produce surprising increases in the grinding performance of coated abrasive articles made from the shaped abrasive particles with a sloping sidewall. In particular, draft angles of 98 degrees, 120 degrees, or 135 degrees have been found to have improved grinding performance over a draft angle of 90 degrees. The improvement in grinding performance is particularly pronounced at draft angles of 98 degrees or 120 degrees as seen in FIGS. 6 and 7 of U.S. patent application Ser. No. 12/337,075.

Figure 3:
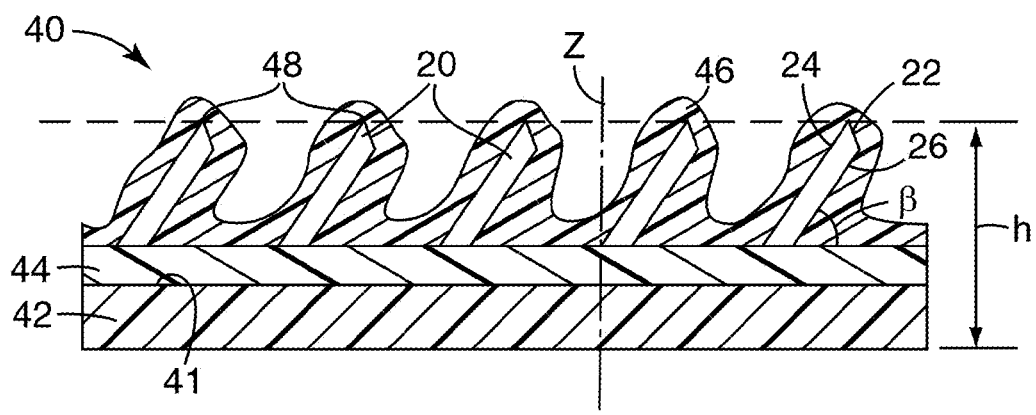
FIG. 3 illustrates a coated abrasive article made from the shaped abrasive particles of FIG. 1.

Referring to FIG. 3, the shaped abrasive particles 20 can be used to make a coated abrasive article 40 having a first major surface 41 of a backing 42 covered by an abrasive layer. The abrasive layer comprises a make coat 44 over the first major surface 41 and a plurality of shaped abrasive particles 20 attached to the make coat 44 typically by the sidewall 22. A size coat 46 is applied to further attach or adhere the shaped abrasive particles 20 to the backing 42. An optional super size coating as known to those of skill in the art may also be applied.

Referring back to FIG. 1, the shaped abrasive particle 20 comprises a longitudinal axis 50 extending from a base 52 to the grinding tip 54. The sidewall 22 of the base 52 is typically attached to the backing 42 in the coated abrasive article 40 by the make coat 44. To determine the Roundness Factor, the shaped abrasive particle 10 is sawn transversely at 90 degrees to the longitudinal axis 50. The transverse cut, C, should be at a location between a first transverse line 56 drawn at ¼ of the particle's overall length along the longitudinal axis and a second transverse line 58 drawn at ¾ of the particle's overall length such that the transverse cut is through the middle half of the particle's overall length. Desirably the transverse cut is located as close as possible to the midpoint 60 of the longitudinal axis 50. A silicon wafer slicing saw can be used to transversely cut the shaped abrasive particle 20 or the shaped abrasive particle can be ground down to the appropriate distance. The transverse cut should be fairly smooth such that the perimeter of the resulting cross-sectional plane is crisp and well defined. If necessary, the resulting cross-sectional plane can be polished to a uniform height.

Figure 4:
FIG. 4 is a photomicrograph of a cross-sectional plane of the triangular shaped abrasive particle taken a 4-4 of FIG. 1.

The shaped abrasive particle 20, after sectioning, is mounted by its base 52 onto a scanning electron microscope (SEM) stub such that the cross-sectional plane of the transverse cut is horizontal. A photomicrograph of the cross-sectional plane is taken using back scattered electron imaging in an SEM. An appropriate magnification is used such that the entire cross-sectional plane can be viewed, and the size of the cross-sectional plane is maximized to fill the SEM's field of view. A typical SEM image of the cross-sectional plane is shown in FIG. 4 at 100× magnification.

Figure 5:
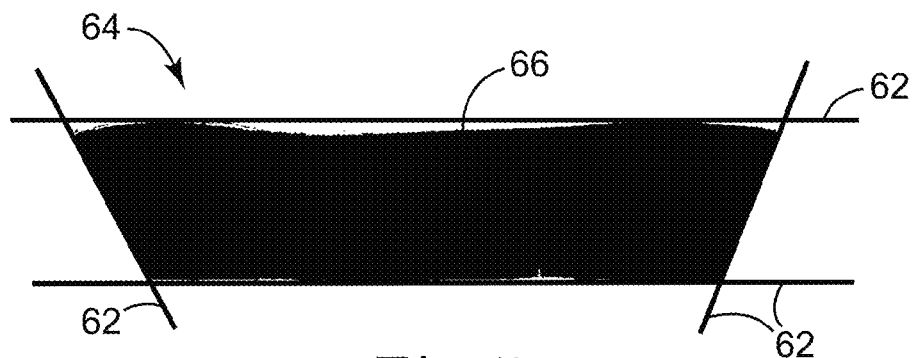
FIG. 5 illustrates the measured area of the cross-sectional plane of the triangular shaped abrasive particle of FIG. 4 that is bounded by lines drawn tangent to the highest two points of each face of the shaped abrasive particle.

Next, as shown in FIG. 5, each face of the shaped abrasive particle 20 (sidewalls 22, first face 24, and second face 26) is bounded by a line 62 drawn tangent to the two highest points located anywhere along that face, thereby enclosing a Maximum Area 64 having a polygonal shape. For a shaped abrasive particle having a generally triangular cross-section three lines are drawn, for a generally rectangular cross-section four lines are drawn, for a pentagonal cross-section five lines are drawn and so on.

Next, using image analysis software such as Image J (available from the National Institute of Health) the Actual Area 66 of the cross-sectional plane as shown in FIG. 5 in black is subtracted from the Maximum Area 64 bounded by the polygon to determine the Missing Area 68 as shown in black in FIG. 6. The Missing Area 68 represents the amount of area present due to rounded corners, and uneven edges of the shaped abrasive particle 20. Minimizing the Missing Area 68 is believed to enhance grinding performance since the particle will tend to have sharper corners and flatter edges.

Using image analysis software or other appropriate measurement technique, the area occupied by the Actual Area 66 in black in FIG. 5 and the area occupied by the Missing Area 68 in black in FIG. 6 are determined. The Roundness Factor expressed as a percentage is calculated by dividing the Missing Area 68 (FIG. 6 in black) by the Actual Area 66 (FIG. 5 in black) and multiplying by 100. Roundness Factor %=Missing Area/Actual Area*100. The process is repeated such that 10 individual shaped abrasive particles are sawn and measured. The Average Roundness Factor for the 10 samples is determined by averaging the 10 individual results. A Roundness Factor of zero percent would indicate the shaped abrasive particle had perfectly filled corners and completely linear edges. If a circle was bounded by a square touching each side, the Roundness Factor would be 27.3% meaning approximately 27.3% of the circle's area is needed to fill out the missing corners of the square.

Figure 8:
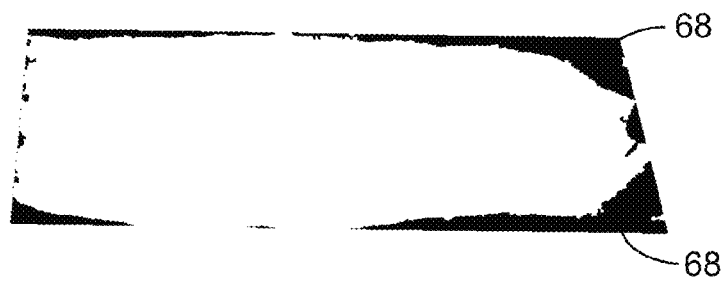
FIG. 8 illustrates the area between the tangent lines and the faces of the cross-sectional plane of the prior art triangular shaped abrasive particle of FIG. 7.

Referring now to FIG. 7 (Actual Area 66) and FIG. 8 (Missing Area 68), a typical cross-sectional plane for a triangular shaped abrasive particle (Rowenhorst particles) produced according to the method in disclosed in U.S. Pat. No. 5,201,916 to Berg; U.S. Pat. No. 5,366,523 to Rowenhorst (U.S. Pat. No. Re 35,570); and U.S. Pat. No. 5,984,988 to Berg are shown. As seen, the triangular shaped abrasive particles produced by the prior art tend to have much more rounded corners and much greater edge waviness.

Table 1 below reports the Average Roundness Factor for shaped abrasive particles of the current invention versus the prior art.

TABLE 1

| Average Roundness Factor | | |
| --- | --- | --- |
| Sample | Average Roundness Factor % | Standard Deviation N = 10 |
| Example 1 | 7.8 | 2.6 |
| Example 2 | 9.5 | 5.3 |

TABLE 1-continued

| Average Roundness Factor | | |
| --- | --- | --- |
| Sample | Average Roundness Factor % | Standard Deviation N = 10 |
| Prior Art (Comparative Example) | 20.0 | 7.7 |

Figure 9:
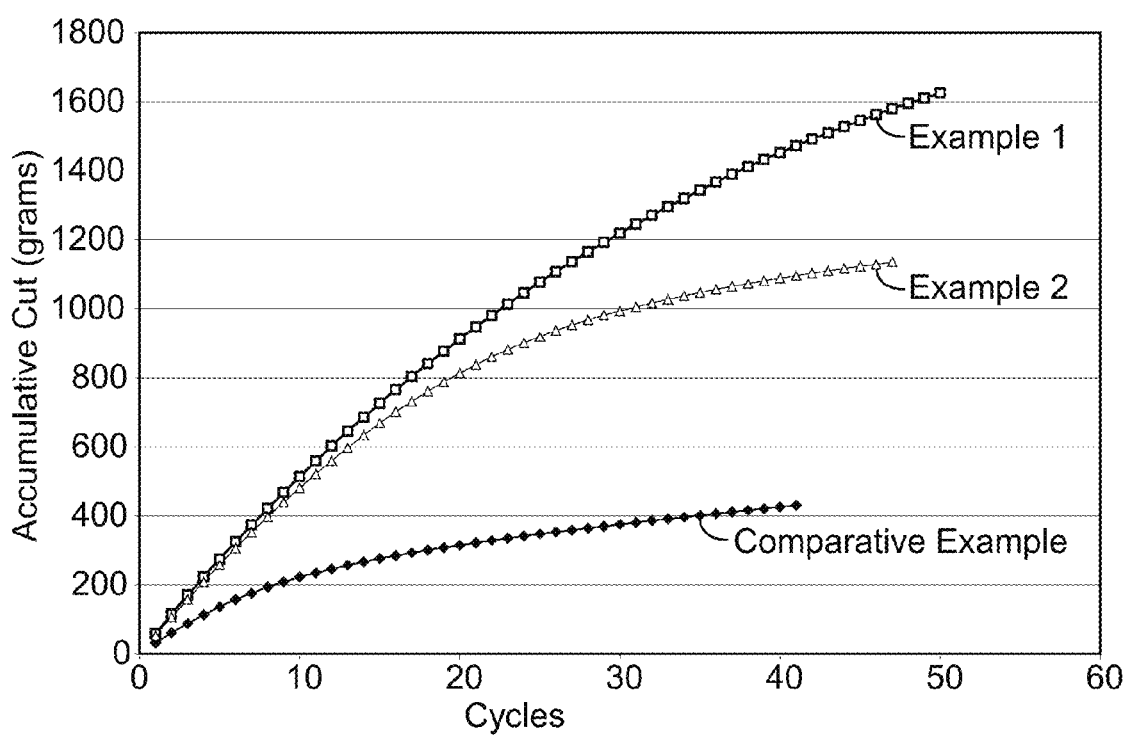
FIG. 9 illustrates a graph comparing grinding performance of the shaped abrasive particles having low Average Roundness Factors to the prior art shaped abrasive particles.

The Average Roundness Factor of the prior art Rowenhorst particles was 20.0% which is fairly close to the 27.3% Roundness Factor that would result from a perfect circle bounded by a square. Thus, the Rowenhorst particles have a fairly rounded cross-sectional plane. In contrast, the shaped abrasive particles of the current invention have a much less rounded cross-sectional plane, which is believed to result in the significantly improved grinding performance as shown in FIG. 9. In various embodiments of the invention, the Average Roundness Factor for the shaped abrasive particles can be between about 15% to 0%, or between about 13% to 0%, or between about 12% to 0%, or between about 12% to about 5%.

The shaped abrasive particles 20 can have various three-dimensional shapes. The geometric shape of the perimeter 29 can be triangular, rectangular, circular, elliptical, star-shaped or that of other regular or irregular polygons. In one embodiment, an equilateral triangular perimeter was used and in another embodiment, an isosceles triangular perimeter was used.

The geometric shape of the cross-sectional plane resulting from the transverse cut of the shaped abrasive particles can also vary. In all embodiments, a non-circular cross-sectional shape is used. A circular cross-sectional shape is round, which is believed to be duller. It is believed that a non-circular cross-sectional shape has improved grinding performance since one or more sharp corners can be present and one or more sides could be generally linear similar to a chisel blade. Desirably, the cross-sectional shape is a polygonal shape, including but not limited to, a triangle, a rectangle, a trapezoid, or a pentagon. In one embodiment, the perimeter of the shaped abrasive particle was triangular as seen in FIG. 1 and the cross-sectional shape was trapezoidal as seen in FIGS. 2 and 4.

The shaped abrasive particles 20 can have various volumetric aspect ratios. The volumetric aspect ratio is defined as the ratio of the maximum cross sectional area passing through the centroid of a volume divided by the minimum cross sectional area passing through the centroid. For some shapes, the maximum or minimum cross sectional area may be a plane tipped, angled, or tilted with respect to the external geometry of the shape. For example, a sphere would have a volumetric aspect ratio of 1.000 while a cube will have a volumetric aspect ratio of 1.414. A shaped abrasive particle in the form of an equilateral triangle having each side equal to length A and a uniform thickness equal to A will have a volumetric aspect ratio of 1.54, and if the uniform thickness is reduced to 0.25 A, the volumetric aspect ratio is increased to 2.64. It is believed that shaped abrasive particles having a larger volumetric aspect ratio have enhanced cutting performance. In various embodiments of the invention, the volumetric aspect ratio for the shaped abrasive particles can be greater than about 1.15, or greater than about 1.50, or greater than about 2.0, or between about 1.15 to about 10.0, or between about 1.20 to about 5.0, or between about 1.30 to about 3.0.

The shaped abrasive particles can have a much smaller radius of curvature at the points or corners of the shaped abrasive particles present on the first face 24. The equilateral triangular shaped abrasive particles disclosed in U.S. Pat. No. 5,201,916 to Berg; U.S. Pat. No. 5,366,523 to Rowenhorst (U.S. Pat. No. Re 35,570); and U.S. Pat. No. 5,984,988 to Berg had a radius of curvature for the points of the triangle (measured from one side around the point to the next side) of 103.6 microns for the average tip radius. The radius of curvature can be measured from a polished cross-section of the first or second face using image analysis such as a Clemex Image Analysis program interfaced with an inverted light microscope or other suitable image analysis software. The radius of curvature for each triangular apex can be estimated by defining three points at each apex when viewed in cross section at 100× magnification. A point is placed at the start of the tip's curve where there is a transition from the straight edge to the start of a curve, at the apex of the tip, and at the transition from the curved tip back to a straight edge. The image analysis software then draws an arc defined by the three points (start, middle, and end of the curve) and calculates a radius of curvature. The radius of curvature for at least 30 apexes are measured and averaged to determine the average tip radius. The shaped abrasive particles made by the current method are much more precisely made. As such, the average tip radius for the shaped abrasive particles is much less. The average tip radius for shaped abrasive particles made according to the present disclosure has been measured to be less than 19.2 microns. In various embodiments of the invention, the average tip radius can be less than 75 microns, or less than 50 microns, or less than 25 microns. It is believed that a sharper tip promotes more aggressive initial cutting an improved fracturing of the shaped abrasive particles during use.

Shaped abrasive particles 20 made according to the present disclosure can be incorporated into an abrasive article, or used in loose form. Abrasive particles are generally graded to a given particle size distribution before use. Such distributions typically have a range of particle sizes, from coarse particles to fine particles. In the abrasive art this range is sometimes referred to as a "coarse", "control", and "fine" fractions. Abrasive particles graded according to abrasive industry accepted grading standards specify the particle size distribution for each nominal grade within numerical limits. Such industry accepted grading standards (i.e., abrasive industry specified nominal grade) include those known as the American National Standards Institute, Inc. (ANSI) standards, Federation of European Producers of Abrasive Products (FEPA) standards, and Japanese Industrial Standard (JIS) standards.

ANSI grade designations (i.e., specified nominal grades) include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. FEPA grade designations include P8, P12, P16, P24, P36, P40, P50, P60, P80, P100, P120, P150, P180, P220, P320, P400, P500, P600, P800, P1000, and P1200. JIS grade designations include JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS600, JIS800, JIS1000, JIS1500, JIS2500, JIS4000, JIS6000, JIS8000, and JIS10,000.

Alternatively, the shaped abrasive particles 20 can graded to a nominal screened grade using U.S.A. Standard Test Sieves conforming to ASTM E-11 "Standard Specification for Wire Cloth and Sieves for Testing Purposes." ASTM E-11 prescribes the requirements for the design and construction of testing sieves using a medium of woven wire cloth mounted in a frame for the classification of materials according to a designated particle size. A typical designation may be represented as −18+20 meaning that the shaped abrasive particles 20 pass through a test sieve meeting ASTM E-11 specifications for the number 18 sieve and are retained on a test sieve meeting ASTM E-11 specifications for the number 20 sieve. In one embodiment, the shaped abrasive particles 20 with a sloping sidewall 22 have a particle size such that most of the particles pass through an 18 mesh test sieve and can be retained on a 20, 25, 30, 35, 40, 45, or 50 mesh test sieve. In various embodiments of the invention, the shaped abrasive particles 20 with a sloping sidewall 22 can have a nominal screened grade comprising: −18+20, −20+25, −25+30, −30+35, −35+40, −40+45, −45+50, −50+60, −60+70, −70+80, −80+100, −100+120, −120+140, −140+170, −170+200, −200+230, −230+270, −270+325, −325+400, −400+450, −450+500, or −500+635.

In one aspect, the present disclosure provides a plurality of shaped abrasive particles having an abrasives industry specified nominal grade or nominal screened grade, wherein at least a portion of the plurality of abrasive particles are shaped abrasive particles 20. In another aspect, the disclosure provides a method comprising grading the shaped abrasive particles 20 made according to the present disclosure to provide a plurality of shaped abrasive particles 20 having an abrasives industry specified nominal grade or a nominal screened grade.

If desired, the shaped abrasive particles 20 having an abrasives industry specified nominal grade or a nominal screened grade can be mixed with other known abrasive or non-abrasive particles. In some embodiments, at least 5, 10, 15, 20, 25, 30, 35, 40, 45, 50, 55, 60, 65, 70, 75, 80, 85, 90, 95, or even 100 percent by weight of the plurality of abrasive particles having an abrasives industry specified nominal grade or a nominal screened grade are shaped abrasive particles 20 made according to the present disclosure, based on the total weight of the plurality of abrasive particles.

Particles suitable for mixing with the shaped abrasive particles 20 include conventional abrasive grains, diluent grains, or erodable agglomerates, such as those described in U.S. Pat. Nos. 4,799,939 and 5,078,753. Representative examples of conventional abrasive grains include fused aluminum oxide, silicon carbide, garnet, fused alumina zirconia, cubic boron nitride, diamond, and the like. Representative examples of diluent grains include marble, gypsum, and glass. Blends of differently shaped abrasive particles 20 (triangles and squares for example) or blends of shaped abrasive particles 20 with sloping sidewalls having different draft angles (for example particles having an 98 degree draft angle mixed with particles having a 120 degree draft angle) can be used in the articles of this invention.

The shaped abrasive particles 20 may also have a surface coating. Surface coatings are known to improve the adhesion between abrasive grains and the binder in abrasive articles or can be used to aid in electrostatic deposition of the shaped abrasive particles 20. Such surface coatings are described in U.S. Pat. Nos. 5,213,591; 5,011,508; 1,910,444; 3,041,156; 5,009,675; 5,085,671; 4,997,461; and 5,042,991. Additionally, the surface coating may prevent the shaped abrasive particle from capping. Capping is the term to describe the phenomenon where metal particles from the workpiece being abraded become welded to the tops of the shaped abrasive particles. Surface coatings to perform the above functions are known to those of skill in the art.

Abrasive Article Having Shaped Abrasive Particles with Low Roundness Factor

Referring to FIG. 3, a coated abrasive article 40 comprises a backing 42 having a first layer of binder, hereinafter referred to as the make coat 44, applied over a first major surface 41 of backing 42. Attached or partially embedded in the make coat 44 are a plurality of shaped abrasive particles 20 forming an abrasive layer. Over the shaped abrasive particles 20 is a second layer of binder, hereinafter referred to as the size coat 46. The purpose of make coat 44 is to secure shaped abrasive particles 20 to the backing 42 and the purpose of size coat 46 is to reinforce shaped abrasive particles 20. An optional super size coating, as known to those of skill in the art, may also be applied. The majority of the shaped abrasive particles 20 are oriented such that the tip 48 (grinding tip 54 FIG. 1) or vertex points away from the backing 42 and the shaped abrasive particles are resting on the sidewall 22. If a sloping sidewall is used, the shaped abrasive particles 20 are generally tipped or leaning as shown.

To further optimize the leaning orientation, the shaped abrasive particles with a sloping sidewall are applied in the backing in an open coat abrasive layer. A closed coat abrasive layer is defined as the maximum weight of abrasive particles or a blend of abrasive particles that can be applied to a make coat of an abrasive article in a single pass through the maker. An open coat is an amount of abrasive particles or a blend of abrasive particles, weighing less than the maximum weight in grams that can be applied, that is applied to a make coat of a coated abrasive article. An open coat abrasive layer will result in less than 100% coverage of the make coat with abrasive particles thereby leaving open areas and a visible resin layer between the particles. In various embodiments of the invention, the percent open area in the abrasive layer can be between about 10% to about 90%, or between about 30% to about 80%, or between about 40% to about 70%.

It is believed that if too many of the shaped abrasive particles with a sloping sidewall are applied to the backing, insufficient spaces between the particles will be present to allow from them to lean or tip prior to curing the make and size coats. In various embodiments of the invention, greater than 50, 60, 70, 80, or 90 percent of the shaped abrasive particles in the coated abrasive article having an open coat abrasive layer are tipped or leaning having an orientation angle β (FIG. 3) of less than 90 degrees.

Without wishing to be bound by theory, it is believed that an orientation angle β less than 90 degrees results in enhanced cutting performance of the shaped abrasive particles with a sloping sidewall. Surprisingly, this result tends to occur regardless of the shaped abrasive particles' rotational orientation about the Z axis within the coated abrasive article. While FIG. 3 is idealized to show all the particles aligned in the same direction, an actual coated abrasive disc would have the particles randomly distributed and rotated. Since the abrasive disc is rotating and the shaped abrasive particles are randomly distributed, some shaped abrasive particles will be driven into the workpiece at an orientation angle β of less than 90 degrees with the workpiece initially striking the second face 26 while a neighboring shaped abrasive particle could be rotated exactly 180 degrees with the workpiece striking backside of the shaped abrasive particle and the first face 24. With a random distribution of the particles and the rotation of the disc, less than half of the shaped abrasive particles could have the workpiece initially striking the second face 26 instead of the first face 24. However, for an abrasive belt having a defined direction of rotation and a defined point of contact with the workpiece, it may be possible to align the shaped abrasive particles with a sloping sidewall on the belt to ensure that each shaped abrasive particle runs at an orientation angle β of less than 90 degrees and that the workpiece is driven into the second face 26 first as idealized in FIG. 3. In various embodiments of the invention, the orientation angle β for at least a majority of the shaped abrasive particles with a sloping sidewall in an abrasive layer of a coated abrasive article can be between about 50 degrees to about 85 degrees, or between about 55 degrees to about 85 degrees, or between about 60 degrees to about 85 degrees, or between about 65 degrees to about 85 degrees, or between about 70 degrees to about 85 degrees, or between about 75 degrees to about 85 degrees, or between about 80 degrees to about 85 degrees.

The make coat 44 and size coat 46 comprise a resinous adhesive. The resinous adhesive of the make coat 44 can be the same as or different from that of the size coat 46. Examples of resinous adhesives that are suitable for these coats include phenolic resins, epoxy resins, urea-formaldehyde resins, acrylate resins, aminoplast resins, melamine resins, acrylated epoxy resins, urethane resins and combinations thereof. In addition to the resinous adhesive, the make coat 44 or size coat 46, or both coats, may further comprise additives that are known in the art, such as, for example, fillers, grinding aids, wetting agents, surfactants, dyes, pigments, coupling agents, adhesion promoters, and combinations thereof. Examples of fillers include calcium carbonate, silica, talc, clay, calcium metasilicate, dolomite, aluminum sulfate and combinations thereof.

A grinding aid can be applied to the coated abrasive article. A grinding aid is defined as particulate material, the addition of which has a significant effect on the chemical and physical processes of abrading, thereby resulting in improved performance. Grinding aids encompass a wide variety of different materials and can be inorganic or organic. Examples of chemical groups of grinding aids include waxes, organic halide compounds, halide salts, and metals and their alloys. The organic halide compounds will typically break down during abrading and release a halogen acid or a gaseous halide compound. Examples of such materials include chlorinated waxes, such as tetrachloronaphthalene, pentachloronaphthalene; and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, magnesium chloride. Examples of metals include tin, lead, bismuth, cobalt, antimony, cadmium, iron, and titanium. Other grinding aids include sulfur, organic sulfur compounds, graphite, and metallic sulfides. It is also within the scope of this invention to use a combination of different grinding aids; in some instances, this may produce a synergistic effect. In one embodiment, the grinding aid was cryolite or potassium tetrafluoroborate. The amount of such additives can be adjusted to give desired properties. It is also within the scope of this invention to utilize a supersize coating. The supersize coating typically contains a binder and a grinding aid. The binders can be formed from such materials as phenolic resins, acrylate resins, epoxy resins, urea-formaldehyde resins, melamine resins, urethane resins, and combinations thereof. In some embodiments, a supersize coating comprising a thermosetting epoxy resin, a curative, a thermoplastic hydrocarbon resin, a grinding aid, a dispersing agent, and a pigment is used as disclosed in U.S. Pat. No. 5,441,549 (Helmin).

It is also within the scope of this invention that the shaped abrasive particles 20 can be utilized in a bonded abrasive article, a nonwoven abrasive article, or abrasive brushes. A bonded abrasive can comprises a plurality of the shaped abrasive particles 20 bonded together by means of a binder to form a shaped mass. The binder for a bonded abrasive can be metallic, organic, or vitreous. A nonwoven abrasive comprises a plurality of the shaped abrasive particles 20 bonded to a fibrous nonwoven web by means of an organic binder.

Method of Making Shaped Abrasive Particles with Low Roundness Factor

The first process step involves providing either a seeded on non-seeded abrasive dispersion that can be converted into alpha alumina. The alpha alumina precursor composition often comprises a liquid that is a volatile component. In one embodiment, the volatile component is water. The abrasive dispersion should comprise a sufficient amount of liquid for the viscosity of the abrasive dispersion to be sufficiently low to enable filling the mold cavities and replicating the mold surfaces, but not so much liquid as to cause subsequent removal of the liquid from the mold cavity to be prohibitively expensive. In one embodiment, the abrasive dispersion comprises from 2 percent to 90 percent by weight of the particles that can be converted into alpha alumina, such as particles of aluminum oxide monohydrate (boehmite), and at least 10 percent by weight, or from 50 percent to 70 percent, or 50 percent to 60 percent, by weight of the volatile component such as water. Conversely, the abrasive dispersion in some embodiments contains from 30 percent to 50 percent, or 40 percent to 50 percent, by weight solids.

Aluminum oxide hydrates other than boehmite can also be used. Boehmite can be prepared by known techniques or can be obtained commercially. Examples of commercially available boehmite include products having the trademarks "DISPERAL", and "DISPAL", both available from Sasol North America, Inc. or "HiQ-40" available from BASF Corporation. These aluminum oxide monohydrates are relatively pure, i.e., they include relatively little, if any, hydrate phases other than monohydrates, and have a high surface area. The physical properties of the resulting shaped abrasive particles 20 will generally depend upon the type of material used in the abrasive dispersion.

In one embodiment, the abrasive dispersion is in a gel state. As used herein, a "gel" is a three dimensional network of solids dispersed in a liquid. The abrasive dispersion may contain a modifying additive or precursor of a modifying additive. The modifying additive can function to enhance some desirable property of the abrasive particles or increase the effectiveness of the subsequent sintering step. Modifying additives or precursors of modifying additives can be in the form of soluble salts, typically water soluble salts. They typically consist of a metal-containing compound and can be a precursor of oxide of magnesium, zinc, iron, silicon, cobalt, nickel, zirconium, hafnium, chromium, yttrium, praseodymium, samarium, ytterbium, neodymium, lanthanum, gadolinium, cerium, dysprosium, erbium, titanium, and mixtures thereof. The particular concentrations of these additives that can be present in the abrasive dispersion can be varied based on skill in the art. Typically, the introduction of a modifying additive or precursor of a modifying additive will cause the abrasive dispersion to gel. The abrasive dispersion can also be induced to gel by application of heat over a period of time.

The abrasive dispersion can also contain a nucleating agent (seeding) to enhance the transformation of hydrated or calcined aluminum oxide to alpha alumina. Nucleating agents suitable for this disclosure include fine particles of alpha alumina, alpha ferric oxide or its precursor, titanium oxides and titanates, chrome oxides, or any other material that will nucleate the transformation. The amount of nucleating agent, if used, should be sufficient to effect the transformation of alpha alumina. Nucleating such abrasive dispersions is disclosed in U.S. Pat. No. 4,744,802 to Schwabel.

A peptizing agent can be added to the abrasive dispersion to produce a more stable hydrosol or colloidal abrasive dispersion. Suitable peptizing agents are monoprotic acids or acid compounds such as acetic acid, hydrochloric acid, formic acid, and nitric acid. Multiprotic acids can also be used but they can rapidly gel the abrasive dispersion, making it difficult to handle or to introduce additional components thereto. Some commercial sources of boehmite contain an acid titer (such as absorbed formic or nitric acid) that will assist in forming a stable abrasive dispersion.

The abrasive dispersion can be formed by any suitable means, such as, for example, by simply mixing aluminum oxide monohydrate with water containing a peptizing agent or by forming an aluminum oxide monohydrate slurry to which the peptizing agent is added. Defoamers or other suitable chemicals can be added to reduce the tendency to form bubbles or entrain air while mixing. Additional chemicals such as wetting agents, alcohols, or coupling agents can be added if desired. The alpha alumina abrasive grain may contain silica and iron oxide as disclosed in U.S. Pat. No. 5,645,619 to Erickson et al. on Jul. 8, 1997. The alpha alumina abrasive grain may contain zirconia as disclosed in U.S. Pat. No. 5,551,963 to Larmie on Sep. 3, 1996. Alternatively, the alpha alumina abrasive grain can have a microstructure or additives as disclosed in U.S. Pat. No. 6,277,161 to Castro on Aug. 21, 2001.

The second process step involves providing a mold having at least one mold cavity, and preferably a plurality of cavities. The mold can have a generally planar bottom surface and a plurality of mold cavities. The plurality of cavities can be formed in a production tool. The production tool can be a belt, a sheet, a continuous web, a coating roll such as a rotogravure roll, a sleeve mounted on a coating roll, or die. In one embodiment, the production tool comprises polymeric material. Examples of suitable polymeric materials include thermoplastics such as polyesters, polycarbonates, poly(ether sulfone), poly(methyl methacrylate), polyurethanes, polyvinylchloride, polyolefin, polystyrene, polypropylene, polyethylene or combinations thereof, or thermosetting materials. In one embodiment, the entire tooling is made from a polymeric or thermoplastic material. In another embodiment, the surfaces of the tooling in contact with the sol-gel while drying, such as the surfaces of the plurality of cavities, comprises polymeric or thermoplastic materials and other portions of the tooling can be made from other materials. A suitable polymeric coating may be applied to a metal tooling to change its surface tension properties by way of example.

A polymeric or thermoplastic tool can be replicated off a metal master tool. The master tool will have the inverse pattern desired for the production tool. The master tool can be made in the same manner as the production tool. In one embodiment, the master tool is made out of metal, e.g., nickel and is diamond turned. The polymeric sheet material can be heated along with the master tool such that the polymeric material is embossed with the master tool pattern by pressing the two together. A polymeric or thermoplastic material can also be extruded or cast onto the master tool and then pressed. The thermoplastic material is cooled to solidify and produce the production tool. If a thermoplastic production tool is utilized, then care should be taken not to generate excessive heat that may distort the thermoplastic production tool limiting its life. More information concerning the design and fabrication of production tooling or master tools can be found in U.S. Pat. No. 5,152,917 (Pieper et al.); U.S. Pat. No. 5,435,816 (Spurgeon et al.); U.S. Pat. No. 5,672,097 (Hoopman et al.); U.S. Pat. No. 5,946,991 (Hoopman et al.); U.S. Pat. No. 5,975,987 (Hoopman et al.); and U.S. Pat. No. 6,129,540 (Hoopman et al.).

Access to cavities can be from an opening in the top surface or bottom surface of the mold. In some instances, the cavity can extend for the entire thickness of mold. Alternatively, the cavity can extend only for a portion of the thickness of the mold. In one embodiment, the top surface is substantially parallel to bottom surface of the mold with the cavities having a substantially uniform depth. At least one side of the mold, i.e. the side in which the cavity is formed, can remain exposed to the surrounding atmosphere during the step in which the volatile component is removed.

The cavity has a specified three-dimensional shape. In one embodiment, the shape of a cavity can be described as being a triangle, as viewed from the top, having a sloping sidewall such that the bottom surface of the cavity is slightly smaller than the opening in the top surface. A sloping sidewall is believed to enhance grinding performance and enable easier removal of the precursor abrasive particles from the mold. In another embodiment, the mold comprised a plurality of triangular cavities. Each of the plurality of triangular cavities comprises an equilateral triangle.

Alternatively, other cavity shapes can be used, such as, circles, rectangles, squares, hexagons, stars, or combinations thereof, all having a substantially uniform depth dimension. The depth dimension is equal to the perpendicular distance from the top surface to the lowermost point on the bottom surface. The depth of a given cavity can be uniform or can vary along its length and/or width. The cavities of a given mold can be of the same shape or of different shapes.

The third process step involves filling the cavities in the mold with the abrasive dispersion by any conventional technique. In some embodiments, a knife roll coater or vacuum slot die coater can be used. A mold release can be used to aid in removing the particles from the mold if desired. Typical mold release agents include oils such as peanut oil or mineral oil, fish oil, silicones, polytetrafluoroethylene, zinc sterate, and graphite. In general, between about 0.1% to about 5% by weight mold release agent, such as peanut oil, in a liquid, such as water or alcohol, is applied to the surfaces of the production tooling in contact with the sol-gel such that between about 0.1 mg/in$^2$ to about 3.0 mg/in$^2$, or between about 0.1 mg/in$^2$ to about 5.0 mg/in$^2$ of the mold release agent is present per unit area of the mold when a mold release is desired. In one embodiment, the top surface of the mold is coated with the abrasive dispersion. The abrasive dispersion can be pumped onto top surface. Next, a scraper or leveler bar can be used to force the abrasive dispersion fully into the cavity of the mold. The remaining portion of the abrasive dispersion that does not enter cavity can be removed from top surface of the mold and recycled. In some embodiments, a small portion of the abrasive dispersion can remain on the top surface and in other embodiments the top surface is substantially free of the dispersion. The pressure applied by the scraper or leveler bar is typically less than 100 psi, or less than 50 psi, or less than 10 psi. In some embodiments, no exposed surface of the abrasive dispersion extends substantially beyond the top surface to ensure uniformity in thickness of the resulting shaped abrasive particles 20.

The fourth process step involves removing the volatile component to dry the dispersion. Desirably, the volatile component is removed by fast evaporation rates. In some embodiments, removal of the volatile component by evaporation occurs at temperatures above the boiling point of the volatile component. An upper limit to the drying temperature often depends on the material the mold is made from. For polypropylene tooling the temperature should be less than the melting point of the plastic.

In one embodiment, for a water dispersion of between about 40 to 50 percent solids and a polypropylene mold, the drying temperatures can be between about 90 degrees C. to about 165 degrees C., or between about 105 degrees C. to about 150 degrees C., or between about 105 degrees C. to about 120 degrees C. Higher temperatures can lead to improved production speeds but can also lead to degradation of the polypropylene tooling limiting its useful life as a mold.

In one embodiment, a sample of boehmite sol-gel was made using the following recipe: aluminum oxide monohydrate powder (40%) having the trade designation "DISPERAL" was dispersed by high shear mixing into a 1.85% aqueous nitric acid solution (60%) for 10 minutes. The resulting sol-gel was aged for at least 24 hours before coating. The sol-gel was forced into production tooling having triangular shaped mold cavities of 28 mils depth and 110 mils on each side. The draft angle α between the sidewall and bottom of the mold was 98 degrees. The production tooling was manufactured to have 100% of the mold cavities with 8 parallel ridges rising from the bottom surfaces of the cavities that intersected with one side of the triangle at a 90 degree angle. The parallel ridges were spaced every 0.277 mm and the cross section of the ridges was a triangle shape having a height of 0.0127 mm and a 45 degree angle between the sides of each ridge at the tip as described in U.S. pending patent application Ser. No. 61/138,268 referred to below.

The sol-gel was forced into the cavities with a vacuum slot die coating station so that all the openings of the production tooling were completely filled. The sol-gel coated production tooling was passed through a 60-foot convection air oven at 17.5 feet per minute set to 240 degrees Fahrenheit at 5000 cfm air velocity in the 20-foot zone 1 section, 240 degrees Fahrenheit at 4300 cfm air velocity in the 20-foot zone 2 section and 225 degrees Fahrenheit at 3500 cfm air velocity in the 20-foot zone 3 section. The precursor shaped abrasive particles were removed from the production tooling by passing it over an ultrasonic horn.

The fifth process step involves removing the precursor shaped abrasive particles with from the mold cavities. The precursor shaped abrasive particles can be removed from the cavities by using the following processes alone or in combination on the mold: gravity, vibration, ultrasonic vibration, vacuum, or pressurized air to remove the particles from the mold cavities.

The precursor abrasive particles can be further dried outside of the mold. If the abrasive dispersion is dried to the desired level in the mold, this additional drying step is not necessary. However, in some instances it may be economical to employ this additional drying step to minimize the time that the abrasive dispersion resides in the mold. Typically, the precursor shaped abrasive particles will be dried from 10 to 480 minutes, or from 120 to 400 minutes, at a temperature from 50 degrees C. to 160 degrees C., or at 120 degrees C. to 150 degrees C.

The sixth process step involves calcining the precursor shaped abrasive particles. During calcining, essentially all the volatile material is removed, and the various components that were present in the abrasive dispersion are transformed into metal oxides. The precursor shaped abrasive particles are generally heated to a temperature from 400 degrees C. to 800 degrees C., and maintained within this temperature range until the free water and over 90 percent by weight of any bound volatile material are removed. In an optional step, it may be desired to introduce the modifying additive by an impregnation process. A water-soluble salt can be introduced by impregnation into the pores of the calcined, precursor shaped abrasive particles. Then the precursor shaped abrasive particles are pre-fired again. This option is further described in European Patent Application No. 293,163.

The seventh process step involves sintering the calcined, precursor shaped abrasive particles to form alpha alumina particles. Prior to sintering, the calcined, precursor shaped abrasive particles are not completely densified and thus lack the desired hardness to be used as shaped abrasive particles. Sintering takes place by heating the calcined, precursor shaped abrasive particles to a temperature of from 1,000 degrees C. to 1,650 degrees C. and maintaining them within this temperature range until substantially all of the alpha alumina monohydrate (or equivalent) is converted to alpha alumina and the porosity is reduced to less than 15 percent by volume. The length of time to which the calcined, precursor shaped abrasive particles must be exposed to the sintering temperature to achieve this level of conversion depends upon various factors but usually from five seconds to 48 hours is typical. In another embodiment, the duration for the sintering step ranges from one minute to 90 minutes. After sintering, the shaped abrasive particles with a sloping sidewall can have a Vickers hardness of 10 GPa, 16 GPa, 18 GPa, 20 GPa, or greater.

Other steps can be used to modify the described process, such as rapidly heating the material from the calcining temperature to the sintering temperature, centrifuging the abrasive dispersion to remove sludge, waste, etc. Moreover, the process can be modified by combining two or more of the process steps if desired. Conventional process steps that can be used to modify the process of this disclosure are more fully described in U.S. Pat. No. 4,314,827 to Leitheiser.

Additionally, the shaped abrasive particles can have grooves on one of the faces as described in copending provisional application U.S. Ser. No. 61/138,268 entitled "Shaped Abrasive Particles With Grooves", and filed on Dec. 17, 2008. The grooves are formed by a plurality of ridges in the bottom surface of the mold cavity that have been found to make it easier to remove the precursor shaped abrasive particles from the mold. More information concerning methods to make shaped abrasive particles is disclosed in U.S. patent application Ser. No. 12/337,001 entitled "Method Of Making Abrasive Shards, Shaped Abrasive Particles With An Opening, Or Dish-Shaped Abrasive Particles", and filed on Dec. 17, 2008.

EXAMPLES

Objects and advantages of this disclosure are further illustrated by the following non-limiting examples. The particular materials and amounts thereof recited in these examples as well as other conditions and details, should not be construed to unduly limit this disclosure. Unless otherwise noted, all parts, percentages, ratios, etc. in the Examples and the rest of the specification are by weight.

Example 1

Preparation of REO-Doped Shaped Abrasive Particles

A boehmite gel was made by the following procedure: aluminum oxide monohydrate powder (1,235 parts) having the trade designation "DISPERAL" was dispersed by continuous mixing in a solution containing water (3,026 parts) and 70% aqueous nitric acid (71 parts). The sol that resulted was then heated to a temperature of approximately 125° C. in a continuous dryer to produce a 44% solids dispersion. The sol-gel was hand spread and manually forced into production tooling having triangular shaped cavity sizes and dimensions of 28 mils depth and 110 mils on each side. The draft angle α between the sidewall and bottom surface of the mold was 98 degrees. The production tooling was manufactured to have 50% of the mold cavities with 8 parallel ridges rising from the bottom surfaces of the cavities that intersected with one side of the triangle at a 90 degree angle and the remaining cavities had a smooth bottom mold surface. The parallel ridges were spaced every 0.277 mm and the cross section of the ridges was a triangle shape having a height of 0.0127 mm and a 45 degree angle between the sides of each ridge at the tip as described in copending patent application Ser. No. 61/138,268 referred to above.

A one percent dispersion of peanut oil in methanol was brushed onto the production tool to achieve approximately a 46.5 microgram/square cm (0.3 mg/sq. in) release coating of peanut oil. The sol-gel was then manually and uniformly forced into the cavities until all openings of the tooling were completely filled. The sol-gel coated production tooling was placed in a convection air oven set at 55 degrees C. and dried for one hour to produce precursor shaped abrasive particles while residing in the cavities of the production tooling. The precursor shaped abrasive particles were removed from the production tooling by passing it over an ultrasonic horn. The precursor shaped abrasive particles were calcined at approximately 650 degrees C. and then saturated with a mixed nitrate solution of the following concentration (reported as oxides): 1.0% of MgO, 1.2% $Y_2O_3$, 4.0% $La_2O_3$ and 0.05% CoO. The excess nitrate solution was removed and the saturated precursor shaped abrasive particles were allowed to dry after which the particles were again calcined at 650 degrees C. and sintered at approximately 1400 degrees C. Both the calcining and sintering was performed using rotary tube kiln. The Average Roundness Factor for the shaped abrasive particles of Example 1 was measured and determined to be 7.8%.

Example 2

Preparation of REO-Doped Shaped Abrasive Particles

A sample of boehmite sol-gel was made using the following recipe: aluminum oxide monohydrate powder (40%) having the trade designation "DISPERAL" was dispersed by high shear mixing into a 1.85% aqueous nitric acid solution (60%) for 10 minutes. The resulting sol-gel was aged for at least 24 hours before coating. The sol-gel was forced into production tooling having triangular shaped mold cavities of 28 mils depth and 110 mils on each side. The draft angle α between the sidewall and bottom of the mold was 98 degrees. The production tooling was manufactured to have 100% of the mold cavities with 8 parallel ridges rising from the bottom surfaces of the cavities that intersected with one side of the triangle at a 90 degree angle. The parallel ridges were spaced every 0.277 mm and the cross section of the ridges was a triangle shape having a height of 0.0127 mm and a 45 degree angle between the sides of each ridge at the tip as described in U.S. pending patent application Ser. No. 61/138,268 referred to above.

The sol-gel was forced into the cavities with a vacuum slot die coating station so that all the openings of the production tooling were completely filled. The sol-gel coated production tooling was passed through a 60-foot convection air oven at 17.5 feet per minute set to 240 degrees Fahrenheit at 5000 cfm air velocity in the 20-foot zone 1 section, 240 degrees Fahrenheit at 4300 cfm air velocity in the 20-foot zone 2 section and 225 degrees Fahrenheit at 3500 cfm air velocity in the 20-foot zone 3 section. The precursor shaped abrasive particles were removed from the production tooling by passing it over an ultrasonic horn.

The precursor shaped abrasive particles were calcined at approximately 650 degree Celsius (15 minutes) and then saturated with a mixed nitrate solution of the following concentration (reported as oxides): 1.0% of MgO, 1.2% $Y_2O_3$, 4.0% $La_2O_3$ and 0.05% CoO. The excess nitrate solution was removed and the saturated precursor shaped abrasive particles were allowed to dry after which the particles were again calcined at 650 degrees Celsius (15 minutes) and sintered at approximately 1400 degree Celsius (5 minutes). Both the calcining and sintering was performed using rotary tube kilns. The Average Roundness Factor for the shaped abrasive particles of Example 2 were measured and determined to be 9.5%.

Comparative Example

Preparation of Prior Art Shaped Particles

Shaped abrasive particles were prepared according to methods disclosed in U.S. Pat. No. 5,201,916 to Berg; U.S. Pat. No. 5,366,523 to Rowenhorst (U.S. Pat. No. Re 35,570); and U.S. Pat. No. 5,984,988 to Berg. The resulting shaped abrasive particles were of similar size and shape to those described above, but the edges and corners were less well-defined.

Abrasive Article Preparation

After making the inventive and comparative shaped abrasive particles, endless coated abrasive belts were made from shaped abrasive particles of each method. The shaped abrasive particles were electrostatically coated onto a treated polyester backing as described in U.S. Pat. No. 6,843,815 (Thurber et al.), Table 1, Backing Example 12 by procedures well known in the art, using phenolic make coat, size coat, and supersize coat resin compositions as shown in Table 2 to the abrasive article constructions shown in Table 3. The phenolic resin can be made from resole phenol-formaldehyde resin, a 1.5:1 to 2.1:1 (phenol:formaldehyde) condensate catalyzed by 1 to 5% aqueous potassium hydroxide. A supersize coat was also applied over the size coat. The supersize composition used was according to Example 26 of U.S. Pat. No. 5,441,549 (Helmin).

TABLE 2

Make, Size, and Supersize Coat Formulations

| Ingredient | Source | Make Coat | Size Coat | Supersize Coat |
|---|---|---|---|---|
| Phenolic Resin | Base catalyzed resole condensate | 52% | 34.3% | none |
| Water | | 2.6% | 9.1% | 13.3% |
| Wollastocoat | Surface treated calcium silicate, obtrained from NYCO Minerals Inc. as 400 WOLLAST0COAT | 45.4% | none | none |
| Cryolite | Cryolite, obtained from TR International Trading Company, Inc., Houston, TX as RTNC CRYOLITE | none | 53.2% | none |
| Red Iron Oxide | Red iron oxide pigment, obtained from Harcos Pigments Inc., Valparaiso, IN, as KROMA | none | 2.7% | 2.3% |
| Titanium Oxide | Titanium dioxide pigment, obtained from Dupont Titanium Technologies, Wilimington, DE, as TITANIUM DIOXIDE R-960 TI-PURE. | none | 0.7% | none |
| Epoxy Resin | Bisphenol A epoxy resin in water, obtained from Rhone-Poulenc, Inc., Louisville, KY as "CMD 35201" | none | none | 20.5% |
| Curative | 2-ethyl-4-methyl imidazole, obtained from Air Products, Allentown, PA as "EMI-24" | none | none | 0.35% |
| $KBF_4$ | Micronized potassium tetrafluoroborate, obtained from Sigma-Aldrich Corp., St. Louis, MO. | none | none | 53.3 |
| Dispersant | Sodium dioctyl sulfosuccinate, obtained from Cytec Industries, Inc, West Patterson, NJ as "Aerosol OT" | none | none | 0.75% |
| Thermoplastic hydrocarbon resin | Copolymer of vinyl toluene and alpha methyl sytrene, obtained from Hercules Inc., Wilmington, DE as "Piccotex LC-55WK" | none | none | 9.5% |
| | | 100.0% | 100.0% | 100.0% |

TABLE 3

Coated Abrasive Examples

| Coating Weight Description | Comparative Example | Example 1 | Example 2 |
|---|---|---|---|
| Make Weight (gsm) | 248 | 248 | 227 |
| Rowenhorst Shaped Abrasive Particles Weight (gsm) | 1167 | none | none |
| Example 1 Shaped Abrasive Particles Weight (gsm) | none | 928 | none |
| Example 2 Shaped Abrasive Particles Weight (gsm) | none | none | 643 |
| Size Weight (gsm) | 622 | 622 | 517 |
| Supersize Weight (gsm) | 622 | 622 | 517 |

The coated abrasive examples were subjected to the following cure profile. The make and mineral coatings were cured at 90 degrees C. for 60 minutes and 102 degrees C. for 30 minutes. The sized constructions were cured at 90 degrees C. for 60 minutes and 102 degrees C. for 12 hours. The supersized constructions were cured at 90 degrees C. for 30 minutes and 110 degrees C. for 2 hours. The belts were converted to endless 10.16 cm×91.44 cm belts using known splicing techniques and were evaluated using the Grinding Test.

Grinding Test

A grinding test was conducted on the 10.16 cm×91.44 cm belts. The workpiece was a 304 stainless steel bar on which the surface to be abraded measured 2.54 cm by 2.54 cm. A 20.3 cm diameter, 70 durometer rubber, 1:1 land to groove ratio, serrated contact wheel was used. The belt was run at 2750 rpm. The workpiece was applied to the center part of the belt at a normal force of 5 pounds per square inch (34 kPa). The test measured the weight loss of the workpiece after each 15-second cycle of grinding. The workpiece was then cooled and tested again. The test was concluded when the cut rate (grams/15 seconds) was 15% of initial cut rate.

Comparative test results are shown in FIG. 9, which clearly demonstrates the improved total cut and cut rate of the inventive belt of Examples 1 and 2 versus the prior art belt of the Comparative Example using the Rowenhorst shaped abrasive particles.

Other modifications and variations to the present disclosure may be practiced by those of ordinary skill in the art, without departing from the spirit and scope of the present disclosure, which is more particularly set forth in the appended claims. It is understood that aspects of the various embodiments may be interchanged in whole or part or combined with other aspects of the various embodiments. All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. Shaped abrasive particles comprising alpha alumina made from a dispersion of aluminum oxide monohydrate and having a cross-sectional shape along a longitudinal axis of the shaped abrasive particles, the cross-sectional shape comprising a noncircular cross-sectional plane, the shaped abrasive particles comprising an Average Roundness Factor of between about 15% to 0% for the transverse cut, C, of the cross-sectional shape along the longitudinal axis, the shaped abrasive particles comprising an average tip radius of a cross-section of a first and a second face separated by a thickness t ranging from about 25 μm to about 500 μm and the average tip radius is less than 75 microns, and wherein the shaped abrasive particles exhibit a better cut rate during grinding than corresponding shaped abrasive particles having a higher Average Roundness Factor.

2. The shaped abrasive particles of claim 1 comprising the first face and the second face connected to each other by a sidewall; and
a draft angle a is defined between the second face and the sidewall.

3. The shaped abrasive particles of claim 2 wherein a perimeter of the first face and the second face comprises a substantially triangular shape.

4. The shaped abrasive particles of claim 1, 2, or 3 wherein the cross-sectional shape comprises a rectangle.

5. The shaped abrasive particles of claim 1, 2, or 3 wherein the cross-sectional shape comprises a trapezoid.

6. The shaped abrasive particles of claim 5 wherein the draft angle a is between about 95 degrees to about 130 degrees.

7. The shaped abrasive particles of claim 1 comprising a volumetric aspect ratio and the volumetric aspect ratio is greater than about 1.15.

8. The shaped abrasive particles of claim 1, 2, 3, or 7 wherein the Average Roundness Factor is between about 12% to about 5%.

9. The shaped abrasive particles of claim 1 comprising a binder forming an abrasive article selected from the group consisting of bonded abrasive articles, coated abrasive articles, nonwoven abrasive articles, and abrasive brushes.

10. A coated abrasive article comprising the shaped abrasive particles of claim 1, 2, 3, or 7 and a make coat on a first major surface of a backing and a majority of the shaped abrasive particles adhered to the make coat by the sidewall, the shaped abrasive particles forming an abrasive layer, the abrasive layer coated with a size coat, wherein the abrasive layer comprises at least 5 percent by weight of the shaped abrasive particles, and wherein the coated abrasive article exhibits a better cut rate during grinding than a corresponding coated abrasive article having shaped abrasive particles having a higher Average Roundness Factor greater than about 15%.

11. The coated abrasive article of claim 10 wherein a majority of the shaped abrasive particles are adhered to the make coat by the sidewall, and have an orientation angle β between about 50 degrees to about 85 degrees.

12. The coated abrasive article of claim 11 wherein the abrasive layer is an open coat abrasive layer and a percent open area in the abrasive layer is between about 40% to about 70%.

13. The coated abrasive article of claim 12 wherein the abrasive layer comprises 100% by weight of the shaped abrasive particles.

14. The coated abrasive article of claim 12 wherein the orientation angle β is between about 70 degrees to about 85 degrees.

15. A coated abrasive article comprising:
shaped abrasive particles comprising
alpha alumina made from a dispersion of aluminum oxide monohydrate and having a cross-sectional shape along a longitudinal axis of the shaped abrasive particles, the cross-sectional shape comprising a noncircular cross-sectional plane, the shaped abrasive particles comprising an Average Roundness Factor of between about 15% to 0% for the transverse cut, C, of the cross-sectional shape along the longitudinal axis, the shaped abrasive particles comprising an average tip radius of a cross-section of the first or second face and the average tip radius of less than 75 microns and a thickness t ranging from about 25 µm to about 500 µm;

a make coat on a first major surface of a backing with a majority of the shaped abrasive particles adhered to the make coat by the sidewall, the shaped abrasive particles forming an abrasive layer, wherein the abrasive layer comprises at least 5 percent by weight of the shaped abrasive particles; and a size coat coated on the abrasive layer;

wherein the coated abrasive article exhibits a better cut rate during grinding than a corresponding coated abrasive article having shaped abrasive particles having a higher Average Roundness Factor greater than about 15%.

16. The coated abrasive article of claim 15, wherein the abrasive layer is an open coat abrasive layer and a percent open area in the abrasive layer is between about 40% to about 70%.

17. The coated abrasive article of claim 15, wherein the abrasive layer comprises 100% by weight of the shaped abrasive particles.

18. The coated abrasive article of claim 15, wherein a majority of the shaped abrasive particles are adhered to the make coat by the sidewall, and have an orientation angle β between about 50 degrees to about 85 degrees.

19. The coated abrasive article of claim 15, wherein the make coat and the size coat independently comprise a binder.

20. The shaped abrasive particles of claim 2, wherein the draft angle α is about 90 degrees.

* * * * *

UNITED STATES PATENT AND TRADEMARK OFFICE
CERTIFICATE OF CORRECTION

PATENT NO. : 10,137,556 B2
APPLICATION NO. : 12/570067
DATED : November 27, 2018
INVENTOR(S) : Erickson Page 1 of 1

It is certified that error appears in the above-identified patent and that said Letters Patent is hereby corrected as shown below:

On the Title Page

Page 2, Column 2 item (56), (Foreign Patent Documents)
Line 9, delete "RU" and insert -- SU --, therefor.

In the Specification

Column 7
Line 20, delete "are" and insert -- arc --, therefor.

Column 13
Line 45, delete "sterate," and insert -- stearate, --, therefor.

Columns 17/18
Line 7 (TABLE 2), delete "obtrained" and insert -- obtained --, therefor.
Line 8 (TABLE 2), delete "WOLLAST0COAT" and insert -- WOLLASTOCOAT --, therefor.
Line 17 (TABLE 2), delete "Wilimington," and insert -- Wilmington, --, therefor.
Line 32 (TABLE 2), delete "sytrene," and insert -- styrene, --, therefor.

In the Claims

Column 20
Line 15, in Claim 2, delete "a" and insert -- α --, therefor.
Line 25, in Claim 6, delete "a" and insert -- α --, therefor.

Signed and Sealed this
Eighteenth Day of June, 2019

Andrei Iancu
*Director of the United States Patent and Trademark Office*